United States Patent
Campbell

[15] 3,644,172
[45] Feb. 22, 1972

[54] SYSTEM FOR DETERMINING LEAKAGE INSIDE A REACTOR CONTAINMENT

[72] Inventor: Donald A. Campbell, Monroeville, Pa.
[73] Assignee: Westinghouse Electric Corporation, Pittsburgh, Pa.
[22] Filed: Sept. 23, 1968
[21] Appl. No.: 761,638

[52] U.S. Cl. ............................... 176/19 LD, 176/38, 73/40.7
[51] Int. Cl. ............................................................. G21c 17/00
[58] Field of Search ................. 176/19 L, 19, 38; 73/29, 40.7

[56] References Cited

UNITED STATES PATENTS

| | | | |
|---|---|---|---|
| 3,265,301 | 8/1966 | Amdur et al. | 73/29 X |
| 3,287,226 | 11/1966 | Webb | 176/38 X |
| 3,324,710 | 6/1967 | Calkins et al. | 73/29 |
| 3,392,572 | 7/1968 | Brown | 73/29 |
| 3,414,422 | 12/1968 | Chave | 176/38 X |
| 3,446,171 | 5/1969 | Panoff et al. | 176/38 X |
| 3,453,176 | 7/1969 | Edliag | 176/37 |
| 3,454,466 | 7/1969 | Pitt et al. | 176/38 |

*Primary Examiner*—Reuben Epstein
*Attorney*—A. T. Stratton and Z. L. Dermer

[57] ABSTRACT

The invention provides a system for determining the total leakage of steam and water systems inside a reactor containment by measuring the condensate collected by the containment cooling coils. The leakage from the system is present in the containment as vapor, either directly or by subsequent evaporation from the liquid state, is transported by air circulated within the containment and removed by condensation at the cooling coils of the air recirculation system. As equilibrium normally exists between vapor addition to and removal from the air of the containment, measurement of the collected condensate provides measurement of leakage within the containment.

6 Claims, 1 Drawing Figure

PATENTED FEB 22 1972    3,644,172
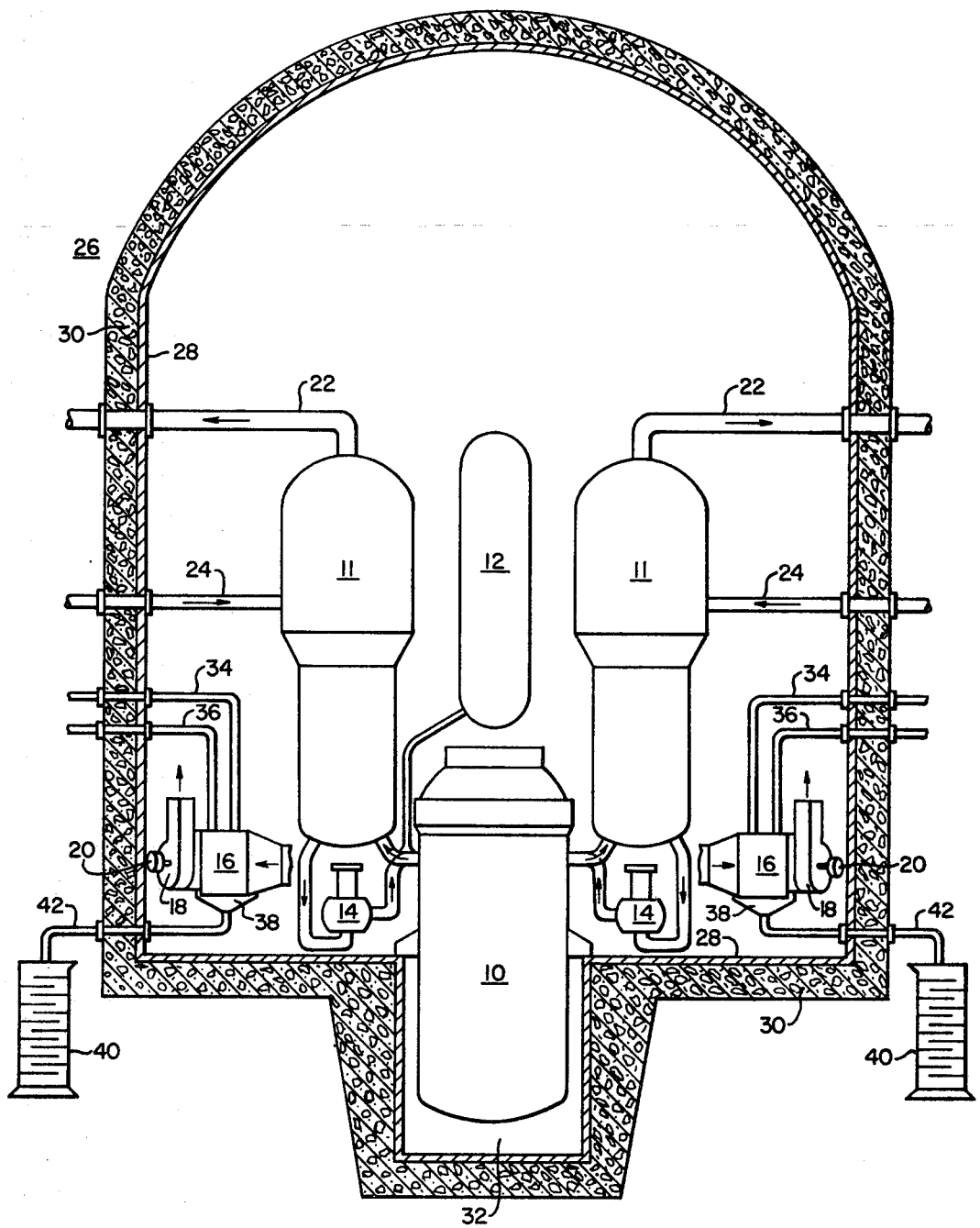
WITNESSES
Theodore F. Wrobel
James F. Young
INVENTOR
Donald A. Campbell
BY Zygmunt L. Germer
ATTORNEY

SYSTEM FOR DETERMINING LEAKAGE INSIDE A REACTOR CONTAINMENT

BACKGROUND OF THE INVENTION

This invention relates, generally, to nuclear reactor power plants and, more particularly, to systems for determining leakage from pressurized fluid systems within the reactor containment.

In the interest of safety, it is desirable that the operator of a nuclear power station periodically determine the leakage occurring from high-pressure fluid systems within the containment for apparatus included in the power plant. Prior methods for detecting this leakage have certain disadvantages. These disadvantages include lack of sensitivity, lack of accuracy, existence of unknown variables affecting the computation of leak rate, complications in determining leak rate from instrument readings, and the undeveloped state of methods for converting instrument readings into leak rates. Furthermore, the results obtained with certain prior methods are accurate only with long-term measurements.

Most prior methods of gauging leakage within the reactor containment rely upon interpretation of key instrumentation. For determining leakage from the reactor coolant system, readings of radioactivity are used. The containment particulate air monitor provides the means for sensitive measurement, even at low radioactivity levels. The uncertainty as to the proportion of radioactive particulates that escape from the reactor coolant and reach the particulate filter without deposition elsewhere introduces an unknown variable to this method. In addition, the sensitivity of this method is related to the accuracy of instrument readout, which is a fixed percentage. Thus, this method produces less accurate results in absolute terms at high readings.

A second method utilizes readings from the containment radioactive gas monitor. This instrument is low in sensitivity and relies on gases which leak from canned fuel. This method has the inherent disadvantage that it is not useful unless such leakage exists. Also, the combination of fuel leakage and reactor coolant leakage must be great enough to cause an indication on a rather insensitive instrument. There are some leaks that this method does not detect, thus, it does not provide complete redundancy of backup to other methods employed.

A third method uses the readings from a humidity detector. This has the advantage of indicating leakage from all sources of steam and water within the containment, but suffers from insensitivity. The sensitivity is a function of air dew point temperature and is a variable which depends on the temperature of the water used for the cooling coils.

Another method for determining leakage from the reactor coolant system requires the careful inventory of all reactor coolant quantities and flows. To overcome the inherent disadvantage of subtracting one large quantity from another to find a small difference, accuracy with this method can be gained only by making measurements over a long period of time.

Accordingly, an object of this invention is to provide a system for determining leakage within a reactor containment from steam and water systems which is inexpensive, accurate, simple, reliable, quick to respond, and readily adaptable to existing designs of containment structures and containment systems.

Another object of the invention is to provide a leakage detecting system in which readout data obtained can be readily interpreted and utilized to calibrate other methods.

Other objects of the invention will be explained fully hereinafter or will be apparent to those skilled in the art.

SUMMARY OF THE INVENTION

In accordance with one embodiment of the invention, cooling coils or devices, air circulators, condensate collecting devices, piping, and means for measuring condensate are utilized to determine leakage from pressurized steam and water systems within a reactor containment. The leakage to the containment occurs both as vapor and liquid with the liquid form quickly evaporating so that all leakage is normally in the vapor state such leakage is transported by the containment atmosphere (i.e., air) normally circulated within the containment and removed by condensation at the cooling coils of the air recirculation system. The condensate is collected and measured, thereby determining the leakage within the containment.

BRIEF DESCRIPTION OF THE DRAWINGS

For a better understanding of the nature and objects of the invention, reference may be had to the following detailed description, taken in conjunction with the accompanying drawing, in which the single FIGURE is a diagrammatic view of a portion of a nuclear reactor power plant embodying principal features of the invention.

DESCRIPTION OF THE PREFERRED EMBODIMENT

Referring to the drawing, the portion of a nuclear reactor power plant shown therein includes a reactor vessel 10, steam generators 11, a pressurizer 12, motor driven pumps 14 for circulating a pressurized reactor coolant between the vessel 10 and the steam generators 11, a plurality of cooling means such as coils 16, and a plurality of air recirculating means such as blowers 18 driven by suitable drive means such as motors 20. The foregoing apparatus is of the usual type provided at a nuclear power plant of the pressurized water type. The nuclear plant functions to produce steam which is conducted to a turbine generator unit (not shown) through pipes 22. The condensed vapor is returned to the steam generators 11 through pipes 24.

The foregoing apparatus is enclosed in a containment 26 of suitable design, for example, a metal liner 28 disposed inside a biological shield 30 composed of reinforced concrete.

As explained hereinbefore, the present invention provides a means for determining the leakage occurring from the pressurized steam and water systems within the containment 26. This is accomplished by collecting and measuring the condensate occurring at the cooling means or coils 16. This condensate will equal the leakage once the equilibrium condition is established. The exception occurs only when a leak is so large that the liquid portion cannot evaporate at the rate at which it is being released, therefore accumulation of water occurs at the containment sump 32. Conditions which assure that condensate collection equals leakage flow, for normally expected leak rates, after the attainment of equilibrium conditions, are:

a. The cooling water temperature is fairly constant.
 b. Containment internal temperatures are warm or hot.
 c. Containment walls are warmer than the temperature of the cooling coil during periods when measurements are taken.
 d. There are no internal bodies of water with surfaces exposed.
 e. The integrity of the containment 26 is high such that leakage from it has no appreciable significance.

It is not necessary that all of these conditions be met. For some items, suitable adjustment can be made to compensate for deviations.

The requirement for water leaks to be evaporated involves evaporation rates and assurance of evaporation. These factors are dependent on temperature and humidity of containment air, the nature of the leakage water flow channel to the containment sump, the air movement over the leakage water, and the quantity and temperature of water leakage in any one location. Normally, conditions are favorable for the evaporation of the leakage water and the circulation thereof by the circulating means 18, as vapor mixed with air within the containment. For instance, the containment air is generally at about 120° F. and the dew point is at the cooling water temperature, resulting in low humidity. Cooling water is circulated through the cooling coils 16 from an outside source (not shown) through pipes 34 and 36.

Usually the cooling water temperature changes slowly with time. As such changes result in dew point temperature changes, changes occur in the inventory of containment atmosphere vapor to correspond. During such changes, there is a deviation from the equilibrium between leakage and collection but the amount of the deviation is determined and compensated for where important.

The condensate from the cooling coils 16 is collected in drip pans 38 mounted beneath the cooling coils 16 and is carried to suitable measuring devices 40 through pipes 42. In the present instance, the measuring devices 40 are shown outside the containment 26. If desired, suitable measuring devices may be located inside the containment.

The present system also measures any leaks in the cooling coils 16. This is the one form of liquid water leakage that does not evaporate and then is condensed. Instead, it is collected directly by the system. Since the cooling is always furnished in multiple units, the discrimination of this kind of leakage from any other is easily done by comparing leakage from individual cooling units. In view thereof, a means of measuring moisture is desirable for each cooling unit. Alternately, it is possible to isolate the return line of the cooling water service to determine if any water collection continues after the cooling coils heats to ambient conditions. Such collection is a direct measurement of coil leakage.

It will be noted that the curing of structural concrete employed in the containment structure produces considerable quantities of water vapor discharged to the atmosphere. Thus, the curing process should be relatively complete before this leakage detection system is put into operation. The hydroscopic nature of concrete to hold moisture as a function of relative humidity is also a problem. A third problem with concrete arises because of its ability to absorb water and reevaporate it, which could have an effect on the time constant for achieving equilibrium. The foregoing problems with concrete may be minimized by providing a special concrete finish on the surfaces of all concrete structures inside the containment 30.

The containment cooling system is provided to remove the heat generated within the containment which is beyond heat losses of the containment structure. The cooling is accomplished by the air recirculating units containing the cooling coils 16 and these coils are necessarily large to accommodate the load. The large heat transfer area ensures that the exit air from the coils has a dew point no higher than the cooling water temperature at the air exit end of the coils. The result is low relative humidity and a condition wherein the other exposed surfaces within the containment can readily be kept above the dew point temperature. As indicated by the arrows, air from within the containment is drawn through the cooling coils 16 by the blowers 18 and discharged into suitable ducts (not shown), thereby being circulated within the containment structure.

In the present instance, the measuring device 40 is shown as a graduate or calibrated container. Thus, the leakage rate may be determined by catching the condensate in the container 40 for a specific time interval and reading the quantity of condensate directly from the graduations on the container. Another method of determining the leakage is to catch the condensate for a specific time interval and weigh it by means of a scale with the readings being compensated for the tare weight of the container. Still another method is to flow the condensate through a calibrated orifice and measure the head required to induce equilibrium flow. Alternately, the condensate may be passed over a calibrated weir and the flow determined by a measurement of the water depth. Another method is to use a mechanical meter fed from a standpipe to force the flow, but check head requirement at beginning and end of measurement in order to compensate for storage differences in the standpipe. Alternately, an adjustable resistance in the flow line can be used to obtain the same head condition for beginning and end measurements. The choice and complexity of the measuring system will depend somewhat on whether the condensate is measured inside or outside of the containment. Multiple units may be provided to secure accuracy of measurement over a sufficient range.

Special handling is not required for the disposal of the condensate. If the condensate is measured inside the containment, it is discharged to the reactor coolant drain tank, thence is taken to waste disposal. If the measurement is outside, the condensate can be piped to any drains that connect either directly or indirectly to the waste disposal system.

As explained hereinbefore, the present system can be utilized to determine leakage within a reactor containment unless the leakage rate is so large that an accumulation of leakage liquid occurs at the containment sump 32. If this occurs, the total leakage can be determined by a measurement of water discharged to the containment sump and adding this to the condensate flow. If it is necessary to keep this water inside the containment, the usual method of measurement would be a time rate of change of depth in the sump. If radioactivity levels are low enough, it is best to pump the water outside for more accurate measurements. Determinations of leakage as a result of sump accumulations are somewhat inaccurate due to the large water quantity corresponding to a small level increase.

From the foregoing description, it is apparent that the present system for determining leakage within a containment has the following advantages:

a. Leakage can be accurately measured for all ranges of leaks.
b. The leakage measured is the total leakage of all water and steam systems within the containment.
c. Under operating conditions measurement of the condensate, which indicates leakage, may be performed outside the containment since the evaporation process undergone by the leakage serves to remove most of the radioactivity.
d. The output measurements is usable as a backup to other methods of leak detection, or for calibration of other methods.
e. It is a minimum cost system requiring, in many cases, only minor modifications to existing plant arrangements.
f. The timelag between the occurrence of new leaks and the detecting of the amount of the new leakage is almost the same as the timelag with the leak detection methods utilizing radiation monitors.

Since numerous changes may be made in the above described construction and different embodiments of the invention may be made without departing from the spirit and scope thereof, it is intended that all subject matter contained in the foregoing description or shown in the accompanying drawings shall be interpreted as illustrative and not in a limiting sense.

I claim:
1. In a nuclear reactor power plant, in combination;
   a. a sealed recirculating system including a reactor vessel, vapor generating means, sealed conduit means flow coupling the vessel and the generating means, and means for circulating pressurized liquid coolant between the generating means and the vessel;
   b. A sealed containment enclosing the vessel and associated components;
   c. at least one cooling device, means for circulating the atmosphere within the containment and through the cooling device to condense vapor transported with the atmosphere, the interior of said sealed recirculating system being separated from said containment atmosphere except when a leak in the sealed recirculating system occurs;
   d. means for collecting the condensate, and means for measuring the quantity of the condensate thereby determining the leakage from said system occurring within the containment.

2. The combination defined in claim 1, wherein the cooling device and the atmosphere circulating means are located within the containment.

3. The combination defined in claim 1, wherein the condensate measuring means is located outside the containment.

4. The combination defined in claim 3, including for conducting the condensate from the collecting means to the measuring means.

5. The combination defined in claim 1, wherein a plurality of cooling devices are utilized and a separate measuring means is provided for each cooling device.

6. The method of determining leakage from a sealed nuclear reactor system located within a sealed containment comprising the steps of maintaining the interior of the containment at a temperature and humidity which causes the leakage to vaporize, circulating the containment atmosphere over a cooling means to condense vapor therefrom, collecting the condensate and measuring the condensate formation.

* * * * *